(12) United States Patent
Boksansky et al.

(10) Patent No.: US 12,190,434 B2
(45) Date of Patent: Jan. 7, 2025

(54) RAY-TRACING FOR AUTO EXPOSURE

(71) Applicant: NVIDIA Corporation, Santa Clara, CA (US)

(72) Inventors: Jakub Boksansky, Munich (DE); Oliver Mark Wright, Northwich (GB)

(73) Assignee: NVIDIA Corporation, Santa Clara, CA (US)

( * ) Notice: Subject to any disclaimer, the term of this patent is extended or adjusted under 35 U.S.C. 154(b) by 261 days.

(21) Appl. No.: 17/528,591

(22) Filed: Nov. 17, 2021

(65) Prior Publication Data

US 2022/0076482 A1 Mar. 10, 2022

Related U.S. Application Data

(62) Division of application No. 16/994,931, filed on Aug. 17, 2020, now Pat. No. 11,308,684.

(60) Provisional application No. 62/888,541, filed on Aug. 18, 2019.

(51) Int. Cl.
*G06T 15/06* (2011.01)
*G06T 15/20* (2011.01)
*G06T 15/50* (2011.01)

(52) U.S. Cl.
CPC .............. *G06T 15/06* (2013.01); *G06T 15/20* (2013.01); *G06T 15/506* (2013.01)

(58) Field of Classification Search
CPC ........ G06T 15/06; G06T 15/20; G06T 15/506
See application file for complete search history.

(56) References Cited

U.S. PATENT DOCUMENTS

| | | | |
|---|---|---|---|
| 5,488,700 A | 1/1996 | Glassner | |
| 6,489,955 B1 | 12/2002 | Newhall, Jr. | |
| 8,207,968 B1 | 6/2012 | Krishnaswamy et al. | |
| 8,223,148 B1 * | 7/2012 | Carr | G06T 15/06 345/426 |
| 8,237,730 B1 * | 8/2012 | Anderson | G06T 15/50 345/589 |
| 8,248,405 B1 * | 8/2012 | O'Donnell | G06T 15/06 345/426 |

(Continued)

OTHER PUBLICATIONS

Westlund, B., H., et al., "Applying appearance standards to light reflection models", In Proceedings of the 28th annual conference on Computer graphics and interactive techniques, pp. 501-510 (Year: 2001).

(Continued)

*Primary Examiner* — King Y Poon
*Assistant Examiner* — Vincent Peren
(74) *Attorney, Agent, or Firm* — Taylor English Duma L.L.P.

(57) ABSTRACT

In various examples, a virtual light meter may be implemented along with ray tracing techniques in order to determine incident light values—e.g., incoming irradiance, incident radiance, etc.—for adjusting auto exposure values of rendered frames. For example, one or more rays may be used to sample incident light over a sampling pattern—such as a hemispherical sampling pattern—for any position in a virtual game environment. As a result, the incident light values may be sampled near a subject of interest in a scene or frame such that exposure values are consistent or stable regardless of the composition of the rendered frames.

27 Claims, 9 Drawing Sheets

(56) References Cited

U.S. PATENT DOCUMENTS

| | | | |
|---|---|---|---|
| 8,314,797 B1* | 11/2012 | Krishnaswamy | G06T 15/506 |
| | | | 345/426 |
| 2006/0088210 A1* | 4/2006 | Yu | G06T 7/90 |
| | | | 382/167 |
| 2009/0003708 A1* | 1/2009 | Steinberg | H04N 23/80 |
| | | | 382/190 |
| 2013/0002671 A1 | 1/2013 | Armsden et al. | |
| 2014/0118364 A1* | 5/2014 | Hakura | G06T 1/20 |
| | | | 345/505 |

OTHER PUBLICATIONS

Notice of Allowance mailed Jan. 12, 2022 in U.S. Appl. No. 16/994,931, 8 pages.

International Search Report and Written Opinion received for PCT Patent Application No. PCT/US2020/046692, mailed on Dec. 18, 2020, 8 pages.

International Preliminary Report on Patentability received for PCT Application No. PCT/US2020/046692, mailed on Mar. 3, 2022, 7 pages.

* cited by examiner

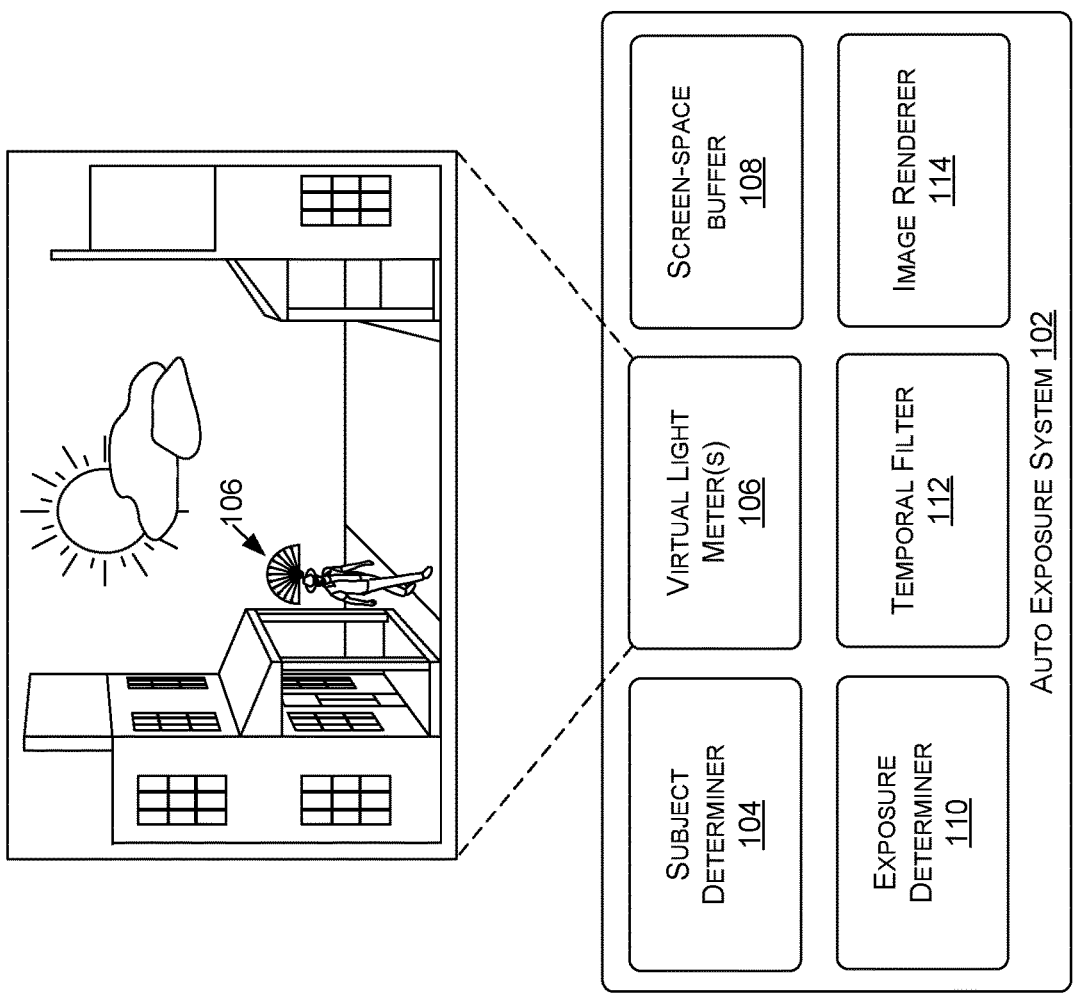

RAY-TRACING FOR AUTO EXPOSURE

CROSS-REFERENCE TO RELATED APPLICATIONS

This application is a divisional of U.S. patent application Ser. No. 16/994,931, filed Aug. 17, 2020; which claims the benefit of U.S. Provisional Application No. 62/888,541, filed on Aug. 18, 2019. Each of these applications is hereby incorporated by reference in its entirety.

BACKGROUND

Proper exposure levels for rendered frames of applications like video games provide for more realism while also allowing a player to navigate a game environment more easily. Auto exposure in games generally works by analyzing pixels of a rendered scene, and adjusting the brightness or exposure according to the pixel values such that a pleasing balance is achieved. For example, where some pixels are lighter and others are darker, the exposure values determined may correspond to some balance between the light and dark pixels such that each are exposed properly. However, these conventional approaches often struggle in situations where everything in the image is either dark or bright. For example, where images are too dark, auto exposure algorithms may increase the exposure levels to a point that everything in the image is over-brightened. Similarly, where images are too bright, auto exposure algorithms may decrease the exposure levels to a point where everything in the image is too dark. As another example, where a subject of a scene is captured in front of a bright background—e.g., a person standing with the sky at their back—auto exposure algorithms may expose the pixels depicting the sky appropriately but leave the subject under-exposed (e.g., as a silhouette). In addition, sudden changes in composition across frames—from dark to light, or vice versa—often result in corresponding rapid changes to exposure or brightness that are not only inaccurate to natural perception but also noisy due to rapid changes. For example, as a camera pans across a dark surface to reveal a piece of white paper, conventional auto exposure algorithms may over-expose the frames while only the desk is in the frame, and then, upon the white paper entering the field of view, may quickly switch to under-exposed frames. However, because the actual lighting conditions around the desk may not have changed, this rapid switch from over-exposure to under-exposure does not create a natural or desired presentation of the rendered frames. As a result, conventional auto exposure algorithms may result in sequences of frames that reduce the user experience by making gameplay more challenging— e.g., due to improper exposure of potentially relevant subjects in the frames—while also creating less appealing visuals.

SUMMARY

Embodiments of the present disclosure relate to applying ray-tracing techniques for performing auto exposure in graphically rendered frames. Systems and methods are disclosed that implement virtual light meters using ray tracing to determine incident light values for adjusting auto exposure settings of rendered frames. For example, one or more rays may be used to sample incident light (e.g., as incident radiance, incoming irradiance, and/or light intensity) over a sampling shape—such as a hemisphere or lumisphere—for any position in a virtual environment. As such, and in contrast to conventional processes, the incident light may be sampled near a subject of interest in a scene or frame such that exposure values are consistent or stable regardless of the composition of the rendered frames. In addition, because the light reading may be independent of the reflectance or other surface characteristics of the subject, the exposure values determined from outputs of the virtual light meter are more likely to lead to correct exposure values—even for subjects with unusual surface characteristics. For example, in a situation of a dark desk with a white paper—where the white paper is the subject of interest in the scene—a virtual ray-traced light meter may be implemented near (e.g., above, next to, in front of, etc.) the white paper in the virtual scene to measure the incident light such that exposure values for the rendered frames are tailored for proper exposure of the white paper. In such an example, if a camera were to pan across the dark desk in frames that alternately include and omit the white paper, the exposure values may stay consistent because the exposure values are determined not from the pixels of the rendered frames—but rather from the outputs of the virtual light meter.

In some scenes, there may be subjects, objects, or surfaces that are brighter than a white piece of paper, for example, such as the sky, specular reflections, or emissive surfaces. As such, to account for not only the white piece of paper but also the other subjects, objects, or surfaces of the scene, the exposure values from the virtual light meter may be used to set an exposure upper limit, and the exposure values may be adjusted in view of the pixels of the rendered image—e.g., to reduce exposure for things that may be brighter than the white piece of paper. A similar process may be executed for dark surfaces, where the auto exposure values from the virtual light meter may be used as a lower limit, and the exposure values may be adjusted in view of the pixels of the rendered image—e.g., to increase exposure for things that may be darker than the desk where the desk is the subject of the frame.

BRIEF DESCRIPTION OF THE DRAWINGS

The present systems and methods for ray-tracing for auto exposure are described in detail below with reference to the attached drawing figures, wherein:

FIG. 1 is a block diagram of an auto exposure system, in accordance with some embodiments of the present disclosure;

DETAILED DESCRIPTION

Figure 2A:
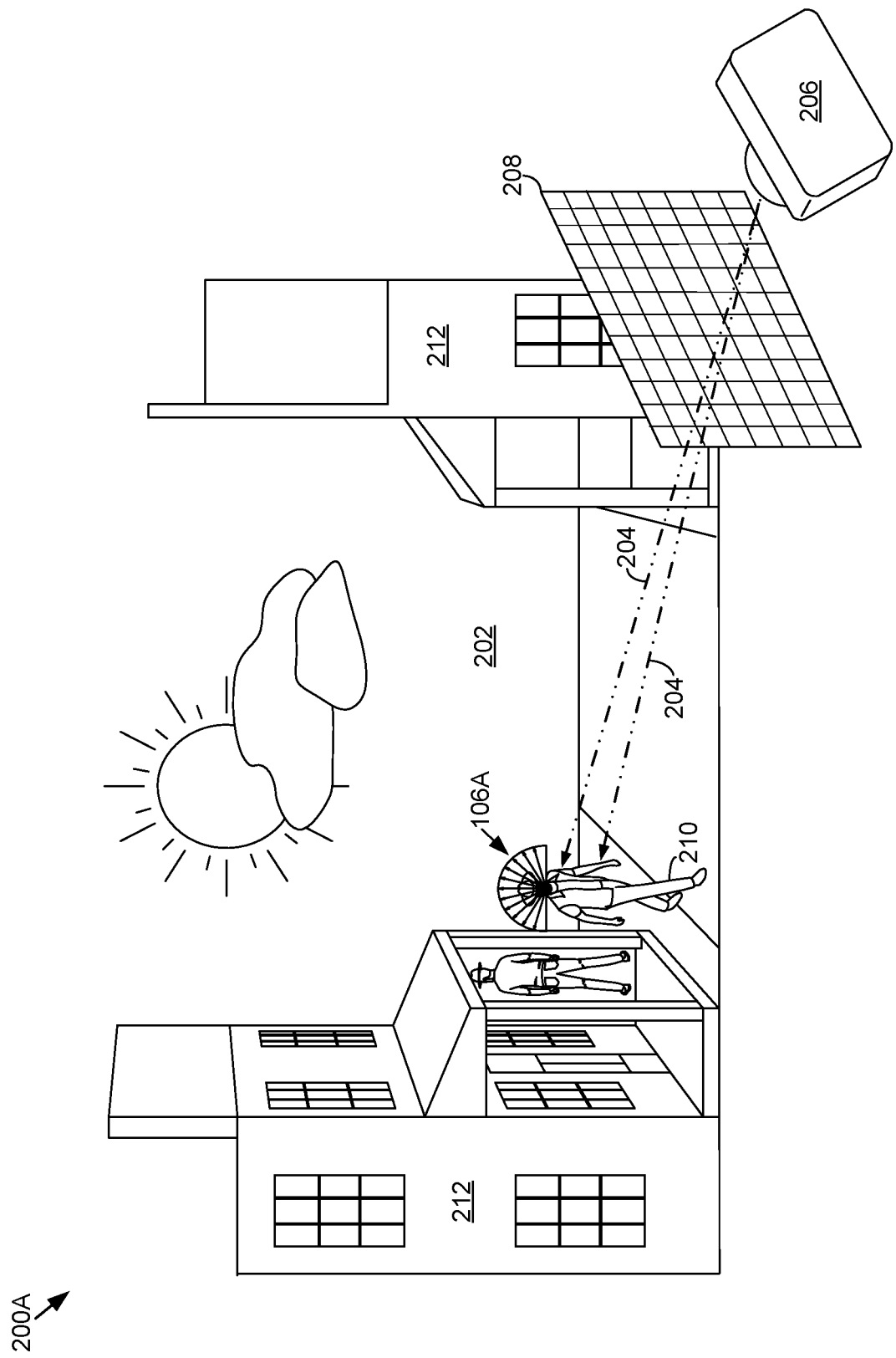
FIGS. 2A-2B depict example visualizations of using virtual light meters to determine exposure values for rendered frames, in accordance with some embodiments of the present disclosure.

Systems and methods are disclosed related to applying ray-tracing techniques for performing auto exposure in graphically rendered frames. Although described primarily with respect to virtual environments corresponding to video game applications, this is not intended to be limiting. For examples, the systems and methods of the present disclosure may be implemented for any applications that include virtual or semi-virtual (e.g., augmented or mixed reality) environments, such as virtual reality (VR) applications, augmented reality (AR) applications, computer aided design (CAD) applications, simulation applications (e.g., robotics simulations, vehicle simulations, etc.), and/or other application types.

With reference to FIG. 1, FIG. 1 is an example auto exposure system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software, or any combination thereof. For instance, various functions may be carried out by a processor executing instructions stored in memory. In some embodiments, features, functionality, and/or components of the system 100 may be similar to those of example content streaming system 500 of FIG. 5 and/or example computing device 600 of FIG. 6. For example, in some embodiments and with respect to FIG. 5, the auto exposure system 100 may correspond to a content streaming application, and the methods described herein for determining exposure values for rendered frames may be executed by an application server(s) 502 to generate rendered frames which may be streamed to the client device(s) 504.

The auto exposure system 100 may include, without limitation, a subject determiner 104, a virtual light meter(s) 106, a screen-space buffer 108, an exposure determiner 110, a temporal filter 112, and/or an image renderer 114. The subject determiner 104 may determine one or more subjects in the virtual environment. For example, the subjects may correspond to potential subjects for which exposure values will be determined. In some embodiments, a single subject may be determined, while in other embodiments any number of subjects may be determined. The subjects may include persons, animals, buildings, static objects, dynamic actors, and/or other subject types. The subject determine 104 may determine the subject(s) to generate exposure values based on using application data, in some embodiments. For example, application data may indicate a particular subject(s) that is the focus of a scene. Similar to a storyboard that a director may use to determine where or on whom to focus a scene, the application data may be analyzed to determine the subject(s) of each frame. As such, the application data—which may represent application state information (e.g., game state information)—may be used to determine a subject and a location of the subject in the virtual environment. Depending on the application type, the subject type may differ. For example, for games with avatars or characters, the avatars or characters may be the subjects. For games without characters, such as games with buildings, vehicles, etc., the subjects may correspond to the building, the vehicles, or other types of objects. In some embodiments, the subject of the frame may differ on a per frame or per scene basis. For example, for some frames, the subject may correspond to an avatar, in other frames the subject may correspond to an item, and in other frames the subject may correspond to a structure.

In some embodiments, the subject determiner 104 may determine the subject(s) (e.g., persons 210A, 210B, buildings 212, etc.) of the scene or frame using ray-tracing. For example, and with respect to visualization 200A of FIG. 2A, one or more rays 204 may be cast from a virtual camera 206 (e.g., in directions around the center of the field of view) into the virtual environment 202, and the intersection of the rays 204 with one or more objects may be used to determine the subject(s). For example, one or more of the rays 204 may intersect the person 210. In some embodiments, such as where a single subject is to be used, the subject closest to the virtual camera 206 may be used (e.g., a subject determined to be the shortest distance from the virtual camera 206 as determined using sampled data from the rays 204), or a subject identified as a particular type of subject may be used. For example, although buildings 212 may be intersected by one or more rays 204, the person 210 may be selected as the subject that the exposure values should be determined for based on subject selection criteria—e.g., criteria indicating that a person or other animate actor should be exposed for. Where no animate actor is present, the exposure may be measured at some distance from the virtual camera 206 (e.g., two meters, four meters, etc.), using a secondary subject type (e.g., a building), and/or using other criteria.

As an example, in a game application—such as a first person shooter (FPS) game application—the frames may be exposed to resemble the natural perception of the human eye. In such embodiments, the subject may be the character or avatar controlled by the user and viewed from the first person perspective. As such, virtual light meter 106A may be placed at a location in front of or above the avatar or, where there is no avatar in the frame (e.g., because the perspective is from the eyes of the avatar), a virtual light meter 106 may be placed at some location in front of the virtual camera 206 (e.g., directly in front, some distance in front, etc.) in order to measure the incident light (e.g., incoming radiance, irradiance, light intensity, etc.) at the location of the avatar. As a result, when an avatar moves from inside a dark building to an outdoor location, the exposure values may be adjusted such that the frames are exposed to allow navigation when inside the building and exposed to not be too bright when outside. In such an example, were the virtual light meter 106 not used, the frames may be exposed based on the brighter exterior which may underexpose frames even when the avatar or player is still inside of the building (e.g., the frames may appear too dark to navigate interior to the building).

Referring again to FIG. 1, the virtual light meter(s) 106 may be instantiated or placed in the virtual environment at a location(s). As described herein, the location(s) may correspond to a subject(s). The virtual light meter(s) 106 may measure incident light by casting sampling rays from the location(s) of the virtual light meter(s) 106 and in a sampling pattern or shape—such as a hemisphere or lobe. The sampling rays may be traced from their origin—e.g., at a location of a light probe 220 (FIG. 2B) of a virtual light meter 106B—through the environment until the sampling rays 222 hit a light source (e.g., to trace paths that beams of light would take in the virtual world). In some embodiments, without limitation, hundreds of sampling rays—such as approximately 1000 sampling rays—may be cast per virtual light meter 106 per frame. For example, using anywhere from 600 to 1400 sampling rays may result in high quality measures of incident light that can be used to determine exposure levels that result in high quality rendered frames. However, this number is not intended to be limiting, and different numbers of sampling rays may be used without departing from the scope of the present disclosure. When performing ray-tracing for rendering, millions of rays may be cast per frame. As such, by adding approximately 1000 more rays for each virtual light meter 106 for each frame, the run-time of the rendering operation may be minimally impacted while still yielding high quality results.

The virtual light meter(s) 106 may measure incident light, and the incident light values may be used to determine exposure values for the frame(s). For example, the incident light may be measured by evaluating the incident radiance in the vicinity of the subject(s)—e.g., how much light is incident in the vicinity of the subject. In addition to or alternatively from the radiance, the irradiance, light intensity, and/or other light measurements may be evaluated using the sampling rays cast from a location of the virtual light meter(s) 106.

Figure 2B:
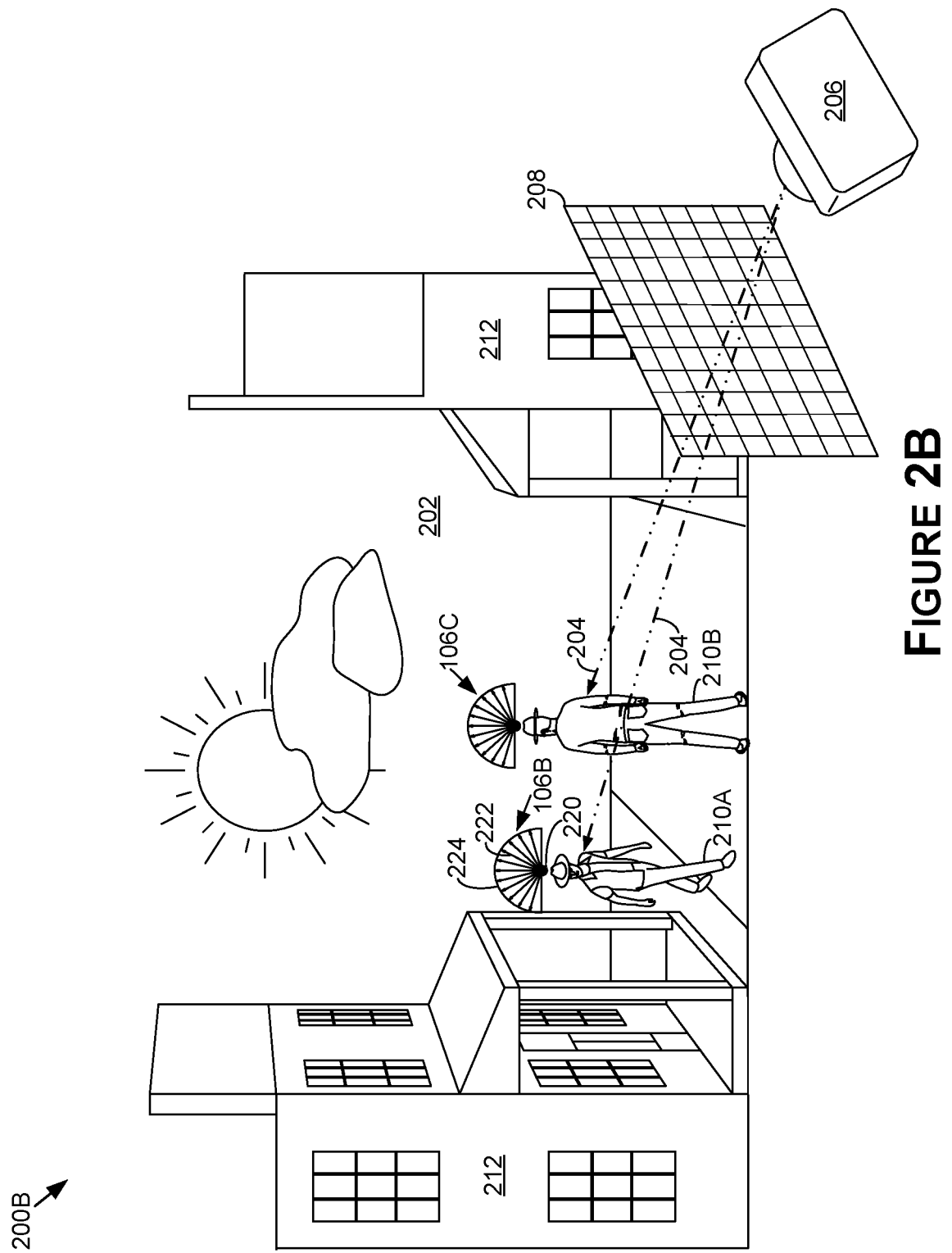

With reference to visualization 200B of FIG. 2B, virtual light meter(s) 106 (e.g., light meters 106B and 106C) may include a probe 220 and one or more sampling rays 222 cast in a sampling pattern 224 around the probe 220—such as a hemispherical pattern in the illustration of FIG. 2B. The sampling pattern or shape of the virtual light meter(s) 106 may be oriented in any direction, depending on the embodiment. As non-limiting examples, the sampling shape may be oriented such that a base of the hemisphere is parallel with a ground plane, may be oriented such that a base of the hemisphere is normal to a direction of a ray 204 that intersects a subject, or may be oriented such that a base of the hemisphere is normal to a subject or surface thereof. In some embodiments, instead of a hemisphere, the sampling shape may correspond to a sphere, or a portion of a hemisphere—e.g., to act as a spot meter for incident light coming from a more focused direction. For example, a focused measuring lobe may be used as a spot meter to "expose for faces" of subjects. The measuring lobe may be placed in the vicinity of, or on, the face of a subject in the virtual environment, and this may generate a proper incident light reading for the face of the subject.

In addition, a location of the probe 220 of the virtual light meter(s) 106 may be located at different locations depending on the embodiment. For example, as illustrated in FIG. 2A, the virtual light meter(s) 106A may be located in front of a subject, such as in front of a face of a subject. This may allow for measurement of the incident light at a subject's face-similar to exposing an image for proper lighting of a person's face. As another example, and with respect to FIG. 2B, the virtual light meters 106B and 106C may be placed above the subject such that shadows from the subject do not interfere with the light measurement. For example, by placing the virtual light meter(s) 106 above the subject, the incident light measurement may more accurately reflect the amount of light falling on the subject from any direction, as opposed to just the amount of light on the subject's face, side, chest, etc. As a further example, the virtual light meter(s) 106 may be instantiated at a direction normal to the rays cast from the virtual camera 206 such that the exposure level is set for the subject based on an amount of incident light in the vicinity of the subject from a perspective of the virtual camera 206. In some embodiments, with reference to visualization 200C of FIG. 2C, virtual light meter 106D may be instantiated at a location and orientation such that the incident light around a surface normal of the subject is measured. In such an example, as described herein, the surface normal information may be retrieved from a screen-space buffer 108 such that calculated incident light information—e.g., from a diffuse light buffer—may be repurposed as the virtual light meter(s) 106D for determining exposure values.

Figure 2C:
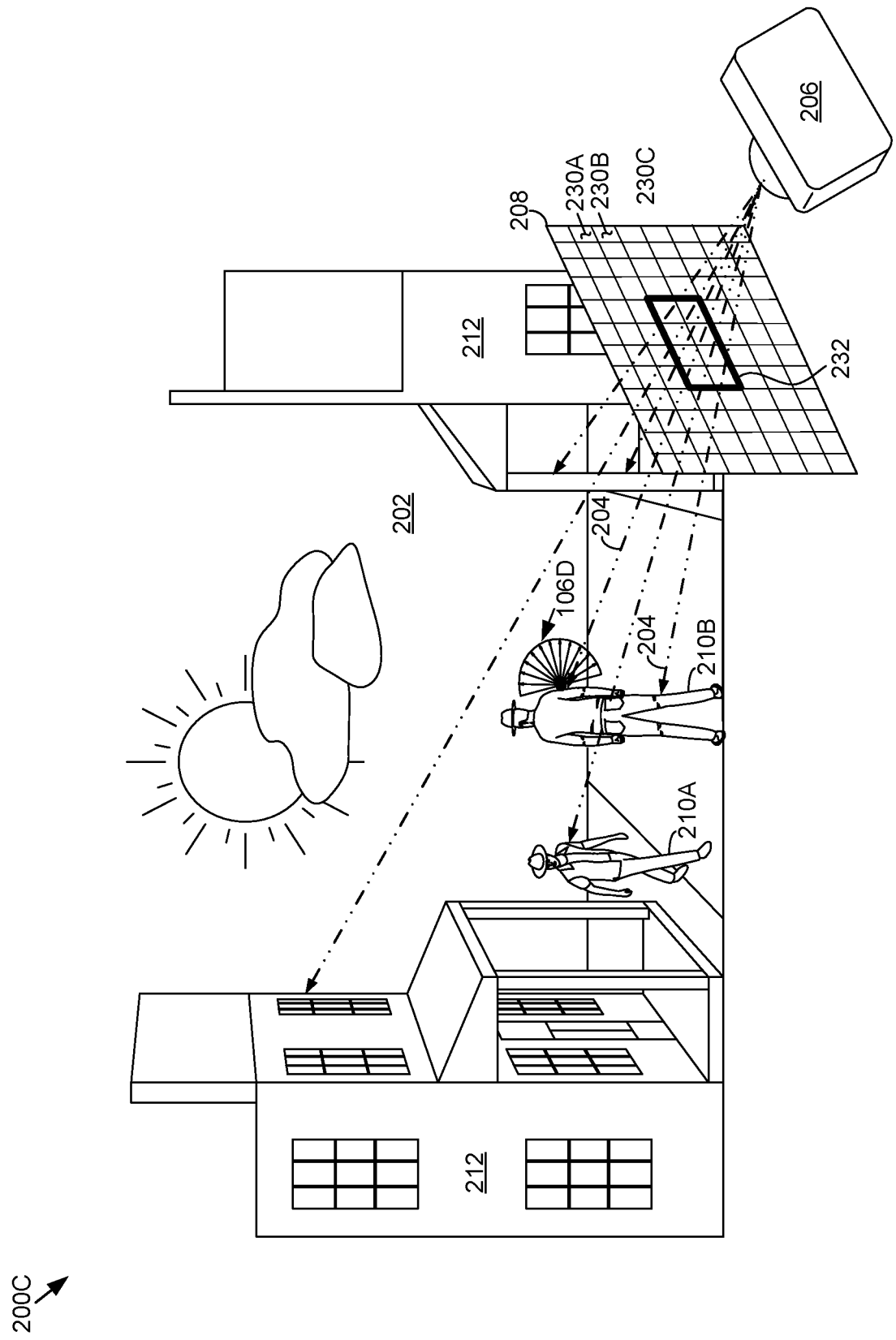
FIG. 2C depicts an example visualization of using computed ray-tracing data from a screen-space buffer as a virtual light meter to determine exposure values for rendered frames, in accordance with some embodiments of the present disclosure.

Moreover, with respect to FIGS. 1 and 2C, the screen-space buffer 108 may be used to determine the light characteristics corresponding to locations in the virtual environment 202 that may be used to determine exposure values for one or more frames. For example, and without limitation, a screen-space buffer 108 may store ray-traced light information for a scene or frame 208. As such, instead of using virtual light meters 106 at locations in the virtual environment (e.g., instead of instantiating the virtual light meter 106D), the ray-traced light information that is stored in the screen-space buffer 108 may be repurposed as the virtual light meter(s) 106. In some embodiments, the screen-space buffer 108 may correspond to a ray-traced indirect diffuse light buffer. For example, and with respect to FIG. 2C, when populating the screen-space buffer 108, rays 204 may be cast from a perspective of the virtual camera 206 for each pixel 230 of the frame 208. These rays 204 may be used for populating a geometry buffer that defines a surface normal for subjects in the virtual environment. Ray-tracing may be executed at the locations in the virtual environment to evaluate lighting information, and the resulting samples may be stored in the screen-space buffer 108. Denoising may be executed on the resulting samples by averaging neighboring pixels 230, and smoothing the values over time. As a result, each pixel 230 of the frame 208 may include similar information to that calculated using a virtual light meter(s) 106. For example, the correspondence between each pixel 230 and a location in the virtual environment 202 may be known based on the rays 204, a surface orientation of the object or subject may be known, and the light incoming to the surface of the subject or object may be known based on sampling the light information at the surface using ray-tracing. This information may be stored for each pixel 230, and used to determine the lighting information for determining exposure values. The lighting information of the screen-space buffer 108—e.g., incident radiance, irradiance, light intensity, etc.—may be encoded in spherical harmonics, in embodiments.

In some embodiments, the screen-space buffer 108 information corresponding to only a subset of the pixels 230 may be used to determine the lighting information—e.g., radiance, irradiance, light intensity, etc.—and the corresponding exposure value for the frame. For example, a grid of pixels 232 may be analyzed to determine which of the pixels 230 in the grid of pixels 232 should be used for determining exposure. The grid of pixels 232 may be centrally located within the frame 208 such that the center pixels of the frame 208 are included within the grid of pixels 232, and/or are centered within the grid of pixels 232. The grid may be rectangular, square, and/or another shape. For example, and without limitation, the grid of pixels 232 may include an 8×8, a 16×16, a 24×24, or a 32×32 grid centered on the frame 208. By centering the grid of pixels 232 on the frame 208, the exposure values may be set for the center of the field of view of the virtual camera 206, which may correspond to—or may be more likely to correspond to—a meaningful portion of the virtual environment 202 for the frame 208, in embodiments. However, in other embodiments, the grid of pixels 232 may not be centered in the frame 208, or may be placed dynamically on a frame by frame or scene by scene basis. For example, application data may be used to determine a location(s) of a subject(s) in the virtual environment 202, and the grid of pixels 232 may be selected to correspond to the location(s).

Each of the pixels 230 within the grid of pixels 232 may be used in some embodiments, while in other embodiments a subset of the pixels 230 in the grid of pixels 232 may be used. For example, an analysis of the subjects, objects, or environmental features corresponding to each pixel 230 in the grid of pixels 232 may be analyzed. As such, where the exposure is to be set for a particular type of subject(s)—e.g., persons, animals, characters, buildings, cars, etc.—the pixels 230 having light information for locations in the virtual environment 202 corresponding to the particular type of subject(s) may be used. In other embodiments, certain subjects or environmental features may be filtered out from consideration-such as the sky, sun, clouds, trees, etc. As such, in any embodiment, the pixels 230 within the grid of pixels 232 may be analyzed to determine the subjects in the virtual environment that the pixels 230 correspond to, and a subset of the pixels 230 may be selected.

Once pixels 230 are selected, the lighting values from the screen-space buffer 108 corresponding to the pixels 230 from within the grid of pixels 232 may be used to determine the final lighting values. In some embodiments, the lighting values for each of the pixels 230 (which correspond to the lighting values for the locations in the virtual environment corresponding to the pixels 230) may be averaged, or weighted, to determine final lighting values—e.g., for incident radiance, irradiance, and/or light intensity.

Referring again to FIG. 1, once lighting values from the virtual light meter(s) 106 and/or the screen-space buffer 108 are determined, these values may be used to determine exposure values by the exposure determiner 110. In some embodiments, the lighting values used for determining the exposure may be averaged or weighted values corresponding to two or more virtual light meter(s) 106 and/or two or more pixels 230 from the screen-space buffer 108. For example, the weighting may be determined based on a distance of the subject from the viewer (e.g., from the virtual camera 206), and/or may be predefined. As a non-limiting example, where the lighting values correspond to incoming irradiance values, the exposure value (EV) may be determined by computing the irradiance values expressed as a power of two (e.g., 2") because exposure follows a logarithmic scale. The computed value may then be clamped to a range between 0 and 1, and the resulting value may be rescaled to a range of −1 to 6 that corresponds to the exposure value. However, this is not intended to be limiting, and a correlation between exposure values and irradiance, radiance, light intensity, and/or other lighting values may be computed using other methods, without departing from the scope of the present disclosure.

In some embodiments, the computed exposure value for a frame using the virtual light meter(s) 106 and/or the screen-space buffer 108 may be weighted or averaged in view of more traditional auto exposure techniques. For example, using ray-tracing to determine the lighting characteristics or values for determining exposure may return accurate results for diffused surfaces—such as subjects—but may not be as accurate for the sky. As such, the exposure value determined using the virtual light meter(s) 106 and/or the screen-space buffer 108 may be used as a clamp for an upper exposure value limit and/or a lower exposure value limit. As such, an exposure value may be computed using more traditional techniques, such as by analyzing each pixel of the frame or image, finding the darkest and lightest pixels, generating histograms, and then determining exposure from this information. This is not intended to be limiting, and exposure values using other techniques may be used, such as using tone mapping. Once an exposure value is determined, it may be compared against the clamp(s) determined using the virtual light meter(s) 106 and/or the screen-space buffer 108. Where the exposure value is below an upper exposure value clamp and/or above a lower exposure value clamp, the exposure value may be used to determine the final exposure value for the frame. For example, the exposure value from the traditional techniques may be used outright, may be averaged with the exposure value determined using the virtual light meter(s) 106 and/or the screen-space buffer 108, and/or may be weighted against the exposure value determined using the virtual light meter(s) 106 and/or the screen-space buffer 108. Where the exposure values determined using traditional techniques are greater than the upper exposure value clamp and/or less than the lower exposure value clamp, the exposure values may be ignored or discarded for the particular frame. As a result, the final exposure values may not only be generated to be accurate for the particular subject(s) of the frame, but may be adjusted to find a balance between the subject(s) of the frame and other environmental features of the frame-such as the sky.

The exposure determiner 110 may use a temporal filter 112 in some embodiments to adjust the exposure values for a frame based on exposure values of a preceding frame(s). For example, a final exposure value for a current frame may be determined by weighting a determining exposure value for the frame in view of one or more prior frames. In some embodiments, this may be recursive (e.g., a running average), such that an exposure value of a current frame may be weighted in view of an exposure value of a prior frame to determine a final value for the current frame. This final value may then be used for weighting against an exposure value of a next frame, and so on. In other embodiments, the exposure value for a current frame may be weighted in view of the exposure value(s) of one or more prior frames without recursivity. In any example, where an exposure value for a current frame is weighted in view of one or more prior frames, the exposure value for the current frame may be weighted less heavily than the prior frame(s) in order to smooth transitions between exposure levels. As a non-limiting example, an exposure value of a prior frame may have a 95% weight and an exposure value for a current frame may have a 5% weight. As another non-limiting example, an exposure value of a prior frame may have a 90% weight and an exposure value for a current frame may have a 10% weight. In other embodiments, however, the current frame may be weighted more heavily than the prior frame(s).

As such, in an example where one virtual light meter 106 using 1000 sampling rays is instantiated per frame, and the frame rate is 60 frames per second (fps), then 60,000 sampling rays may be cast per minute, the exposure values determined from each frame may be weighted over time, and the result may be a smooth exposure over time that does not jump from frame to frame but transitions smoothly. Where a temporal filter 112 is used, the temporal filter 112 may be reset for a new scene, or some inter-application criteria that causes a reset. For example, where a user is navigating the virtual environment in a video game, and reaches a location in the game where a cut scene is to play, the temporal filter 112 may be reset at the start of the cut scene such that the exposure values from the navigating of the virtual environment do not affect the exposure values of the cut scene.

The image renderer 114 may render the image or frame. For example, the frame may be rendered using ray-tracing, may be rendered using other techniques such as rasterization, or a combination thereof. The exposure value for the rendered frame may be adjusted based on the determined exposure value from the exposure determiner 110. In some examples, the exposure value may be used to render the frame, or the exposure value may be used to adjust the frame after rendering. Where the auto exposure system 100 is included in a cloud streaming environment—such as the example content streaming system 500 of FIG. 5—the rendered frame may be encoded and streamed to an end-user device (e.g., the client device 504). In other embodiments, the auto exposure system 100 may be executed by a local system, such as a laptop, desktop, tablet, gaming console, smart phone, and/or the like. In such examples, the rendering may be executed locally, or the rendering may be executed remotely, and the auto exposure system 100 may be used to update the rendered frame locally.

Figure 3:
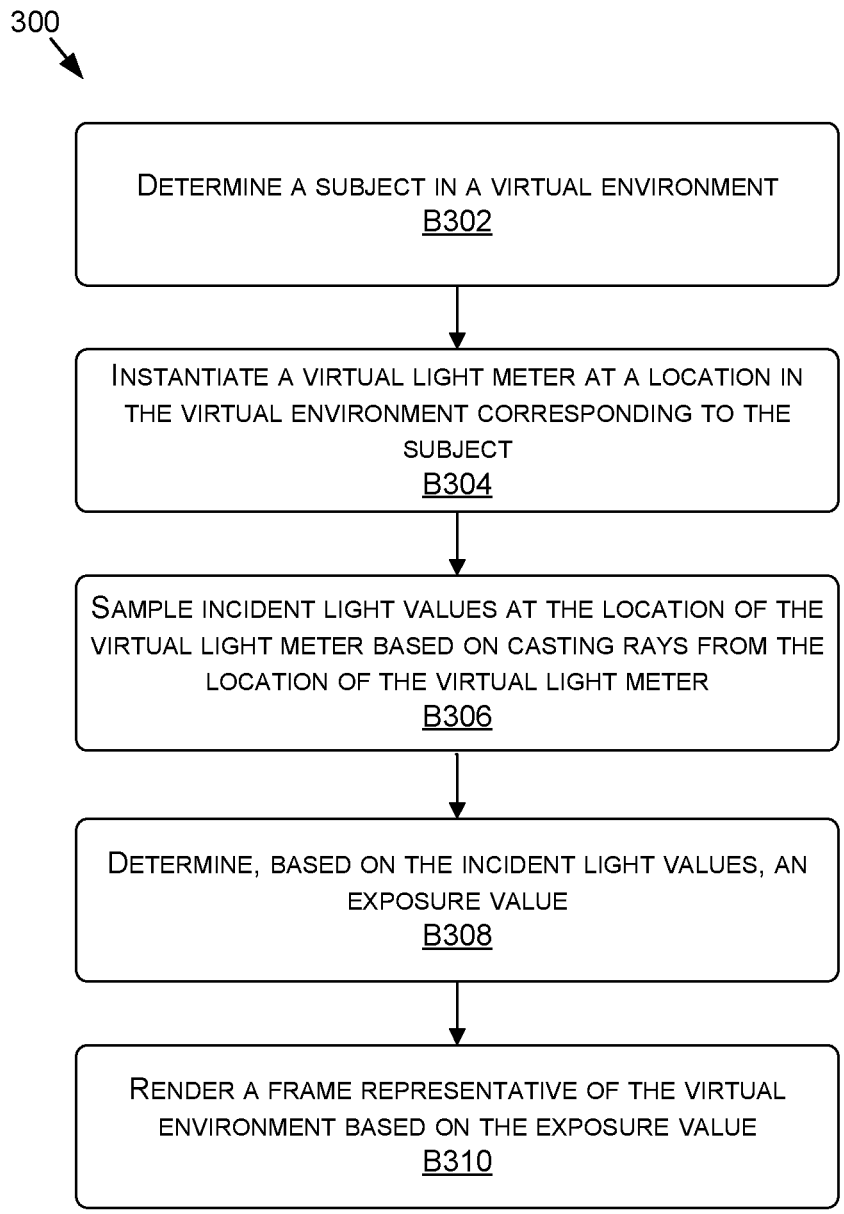
FIG. 3 depicts a flow diagram illustrating a method for determining exposure values using a virtual light meter, in accordance with some embodiments of the present disclosure.
Figure 4:
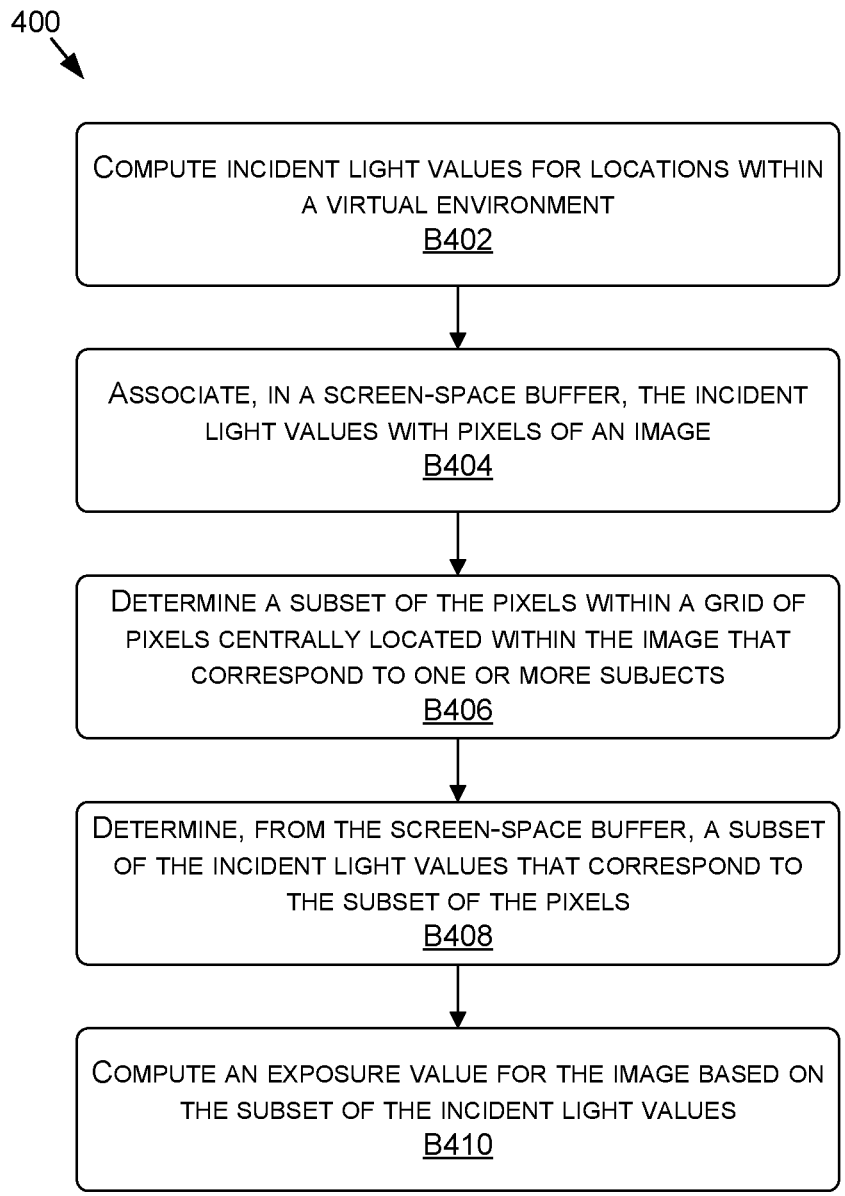
FIG. 4 depicts a flow diagram illustrating a method for using computed ray-tracing data from a screen-space buffer as a virtual light meter for determining exposure values, in accordance with some embodiments of the present disclosure.

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, the methods 300 and 400 are described, by way of example, with respect to the auto exposure system 100 of FIG. 1. However, these methods 300 and 400 may additionally or alternatively be executed by any one system, or any combination of systems, including, but not limited to, those described herein.

Now referring to FIG. 3, FIG. 3 depicts a flow diagram illustrating a method 300 for determining exposure values using a virtual light meter, in accordance with some embodiments of the present disclosure. The method 300, at block B302, includes determining a subject in a virtual environment. For example, the subject determiner 104 may be used to determine a location of a subject in the virtual environment.

The method 300, at block B304, includes instantiating a virtual light meter at a location in the virtual environment corresponding to the subject. For example, a virtual light meter(s) 106 may be instantiated in the virtual environment for measuring the incident light at a location corresponding to the subject. The location corresponding to the subject may include in front of, above, next to, on a face of, touching, and/or some distance from (e.g., an inch, six inches, one foot, one meter, etc.) the subject in the virtual environment.

The method 300, at block B306, includes sampling incident light values at the location of the virtual light meter based on casting rays from the location of the virtual light meter. For example, sampling rays 222 may be cast from a sampling probe 220 of the virtual light meter 106 in a sampling pattern—such as a hemispherical sampling pattern—to evaluate or measure the incident light values at the location. The incident light values may correspond to incoming irradiance, incident radiance, light intensity, and/or other light values.

The method 300, at block B308, includes determining, based on the incident light values, an exposure value. For example, the incident light values may be used to determine an exposure value.

The method 300, at block B310, includes rendering a frame representative of the virtual environment based on the exposure value. For example, a frame 208 may be rendered from a perspective of the virtual camera 206. The frame 208 may be rendered using the exposure value, or the exposure value may be used to adjust the rendered frame.

With reference to FIG. 4, FIG. 4 depicts a flow diagram illustrating a method 400 for using computed ray-tracing data from a screen-space buffer as a virtual light meter for determining exposure values, in accordance with some embodiments of the present disclosure. The method 400, at block B402, includes computing incident light values for locations within a virtual environment. For example, rays may be cast from a perspective of a virtual camera 206 to intersect objects, surfaces, subjects, and/or the like within the virtual environment. Ray-tracing may then be performed to measure incident light values at the objects, surfaces, subjects, etc. within the virtual environment.

The method 400, at block B404, includes associating, in a screen-space buffer, the incident light values with pixels of an image. For example, the incident light values corresponding to the subjects, surfaces, etc. may be stored with corresponding pixels 230 of the screen-space buffer 108. For example, the incident light values measured at the location of intersection of the rays 204 cast from pixels of the virtual camera 206 may be associated with the respective pixels 230 in the screen-space buffer.

The method 400, at block B406, includes determining a subset of the pixels within a grid of pixels centrally located within the image that correspond to one or more subjects. For example, the pixels 230 within the grid of pixels 232 may be analyzed to determine which pixels correspond to subjects of interest—e.g., persons, buildings, cars, animals, etc., and not the sky.

The method 400, at block B408, includes determining, from the screen-space buffer, a subset of the incident light values that correspond to the subset of the pixels. For example, the incident light values that correspond to the pixels 230 from the subset of the pixels may be determined.

The method 400, at block B410, includes computing an exposure value for the image based on the subset of the incident light values. For example, the incident light values may be weighted, averaged, and/or otherwise processed to determine a final incident light value for the frame, and the exposure value may be determined from the final incident light value. This final exposure value may be used to render the frame and/or to adjust the exposure of the frame after rendering.

Example Content Streaming System

Figure 5:
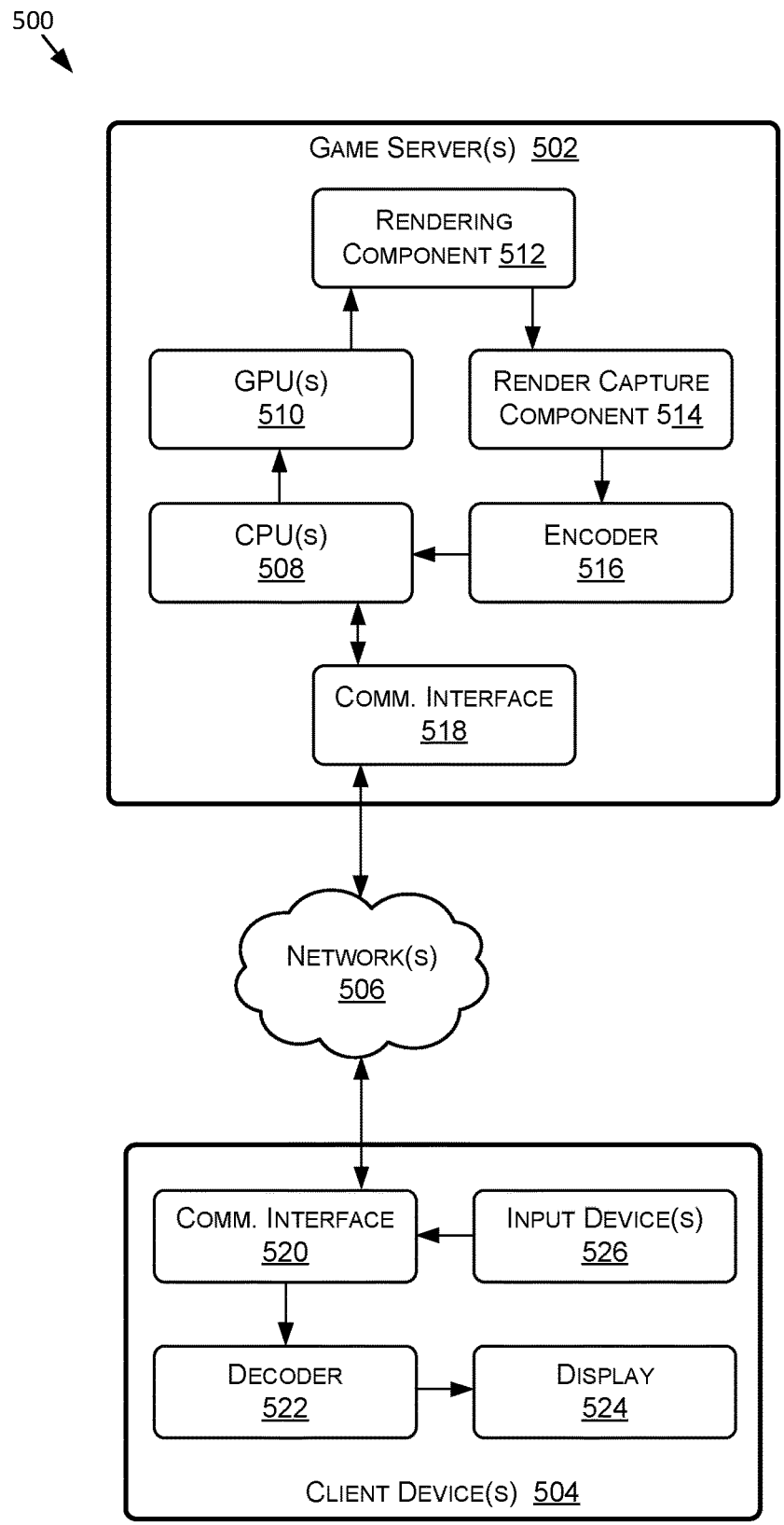
FIG. 5 is a block diagram of an example content streaming system suitable for use in implementing some embodiments of the present disclosure.

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
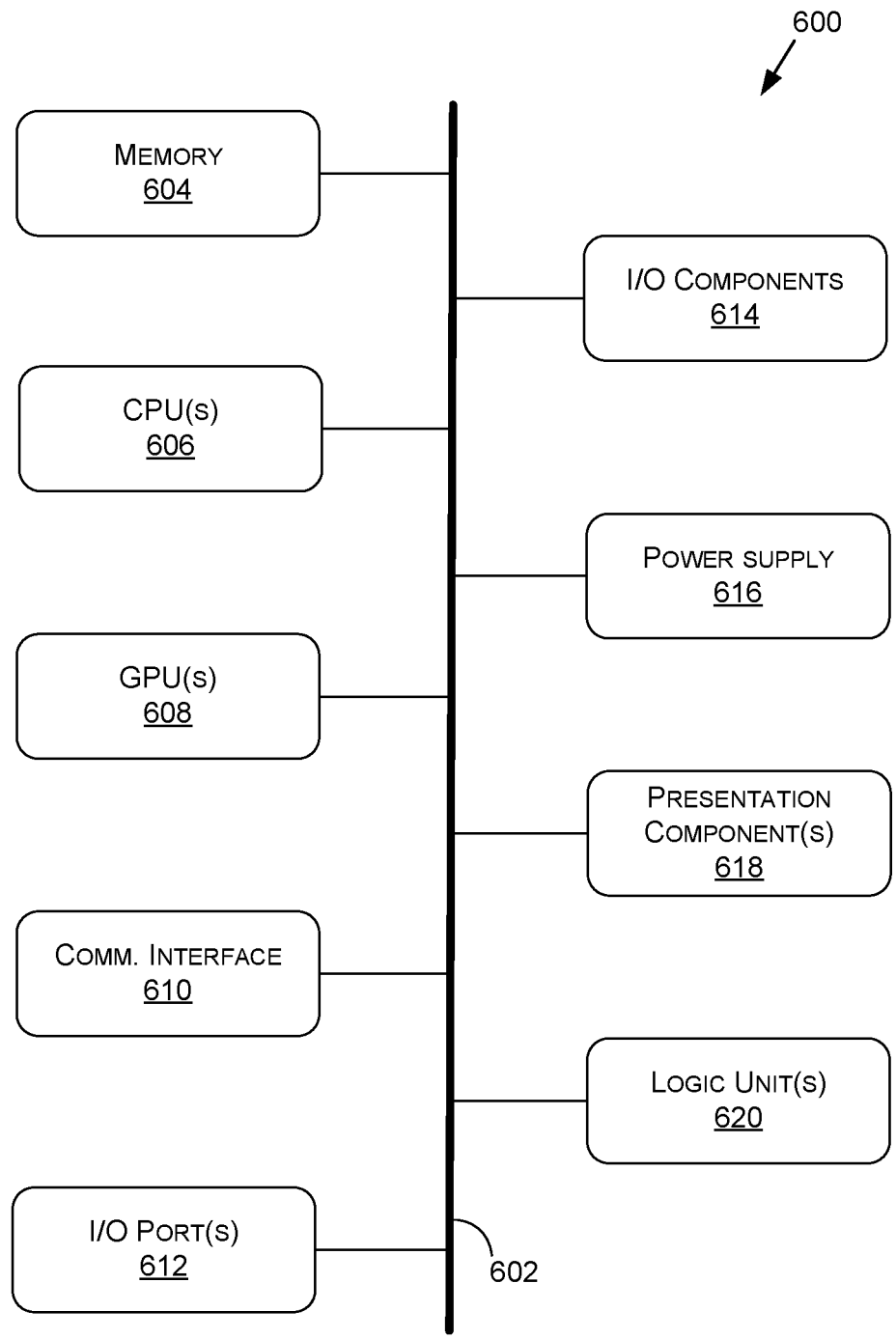
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMS), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
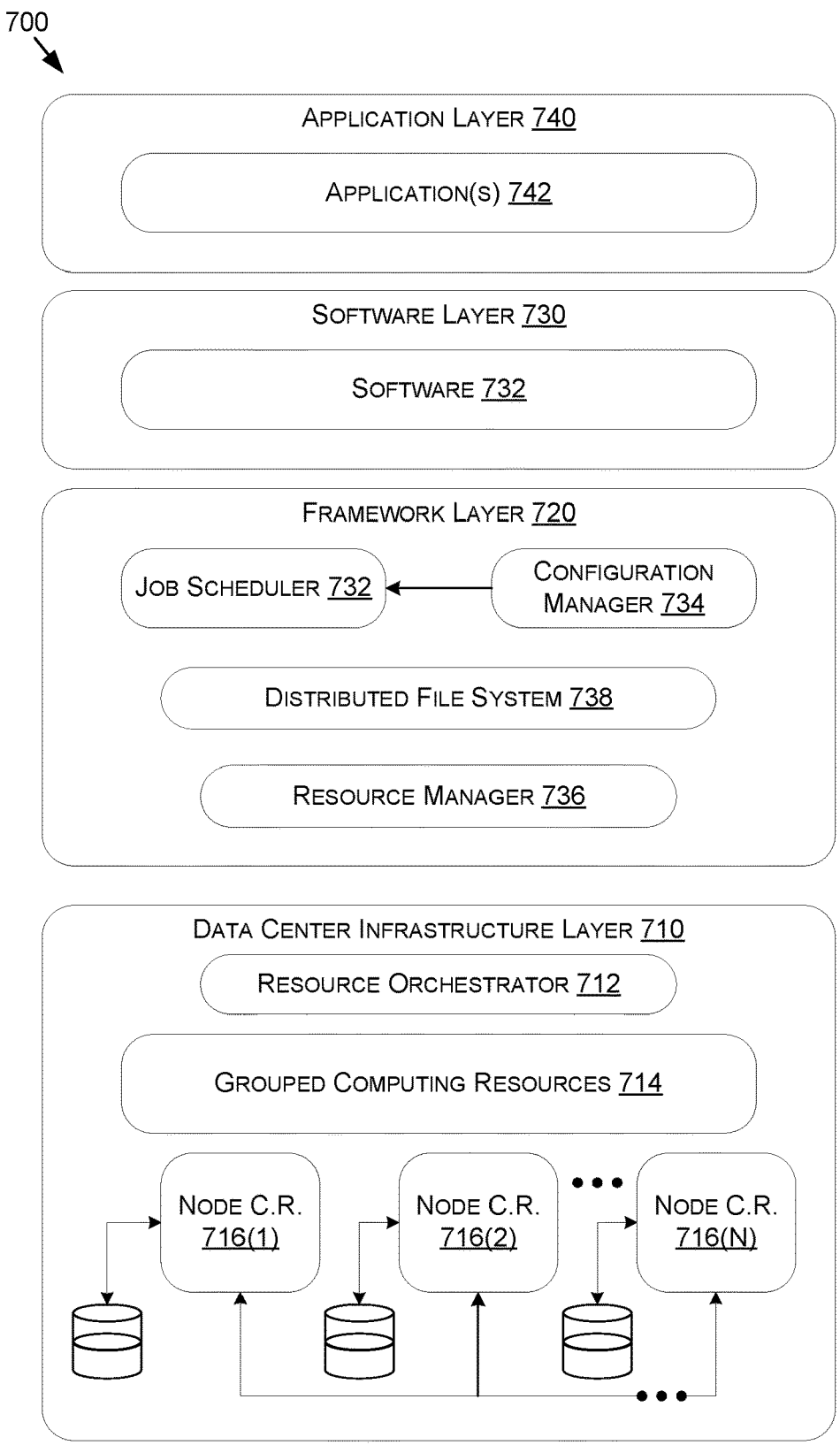
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
processing circuitry to adjust, using one or more exposure values, a relative balance in exposure between a set of pixels and one or more other pixels of an image for a rendered image corresponding to a virtual environment, the one or more exposure values computed based at on incident light values, the incident light values being retrieved from and stored in a screen-space light buffer in association with a set of pixels, the incident light values representing incident lighting computed using one or more ray tracing algorithms.

2. The processor of claim 1, wherein the processing circuitry is further to compute the incident light values using one or more virtual light meters instantiated at one or more locations within a virtual environment depicted by the image.

3. The processor of claim 1, wherein the screen-space light buffer corresponds to a diffuse light buffer and the incident light values are retrieved based at least on calculating the incident light values using corresponding diffuse lighting information retrieved from the diffuse light buffer and corresponding surface normal information.

4. The processor of claim 1, wherein the set of pixels are determined based at least on casting rays from a virtual camera into a virtual environment to identify one or more subjects in the virtual environment.

5. The processor of claim 1, wherein the image corresponds to an application executing at least one of an augmented reality application, a virtual reality application, or a mixed reality application.

6. The processor of claim 1, wherein the processor is comprised in a cloud computing system, and the image corresponds to a cloud application executing using the cloud computing system.

7. A processor comprising:
one or more circuits to:
compute incident light values representing incident lighting at locations within a virtual environment;
store, using a screen-space light buffer, the incident light values in association with pixels of an image corresponding to the locations from a perspective of a virtual camera in the virtual environment;
determine a subset of the pixels of the image corresponds to one or more subjects;
based at least on the determination, retrieve, using the screen-space light buffer, a subset of the incident light values that correspond to the subset of the pixels;
compute one or more exposure values for the one or more subjects in the image based at least on the subset of the incident light values retrieved from the screen-space light buffer;
adjust, using the one or more exposure values, a relative balance in exposure between the subset of the pixels and one or more other pixels of the image for a rendered image corresponding to the virtual environment; and
generate the rendered image based at least on the adjustment of the relative balance.

8. The processor of claim 7, wherein the rendered image is generated based at least on modifying the relative balance in exposure depicted in an initial rendered image to produce the rendered image.

9. The processor of claim 7, wherein the screen-space light buffer corresponds to a diffuse light buffer.

10. The processor of claim 7, wherein the determination of the subset of the pixels includes:
filtering out, from a set of pixels of the image, pixels that correspond to a sky of the virtual environment.

11. The processor of claim 7, wherein the subset of the pixels is selected from a grid of pixels centered on the image and having sides smaller than a resolution of the image.

12. The processor of claim 1, wherein the adjustment of the relative balance in exposure includes increasing or decreasing the one or more exposure values.

13. The processor of claim 7, wherein the adjustment of the relative balance in exposure includes increasing or decreasing one or more second exposure values based at least on the one or more second exposure values corresponding to one or more different subjects than the one or more subjects.

14. The processor of claim 7, wherein the one or more circuits are to determine at least one upper or lower exposure limit for the rendered image based at least on the one or more exposure values, and the adjustment of the relative balance includes modifying one or more second exposure values based at least on the at least one upper or lower exposure limit.

15. The processor of claim 7, wherein the image corresponds to an application executing at least one of an augmented reality application, a virtual reality application, or a mixed reality application.

16. The processor of claim 7, wherein the processor is comprised in a cloud computing system, and the image corresponds to a cloud application executing using the cloud computing system.

17. A system comprising:
one or more processing units comprising processing circuitry to:
compute incident light values representing incident lighting at locations within a virtual environment;
store, using a screen-space light buffer, the incident light values in association with a set of pixels of an image corresponding to the locations from a perspective of a virtual camera in the virtual environment;
determine a subset of pixels from the set of pixels corresponds to one or more identified subjects;
based at least on the determination, retrieve, using the screen-space light buffer, a subset of the incident light values that correspond to the subset of pixels;
compute one or more exposure values for the one or more identified subjects in the image based at least on the subset of the incident light values retrieved from the screen-space light buffer;

adjust, using the one or more exposure values, a relative balance in exposure between the subset of pixels and one or more other pixels of the image for a rendered image corresponding to the virtual environment; and generate the rendered image based at least on the adjustment of the relative balance.

18. The system of claim 17, wherein the adjusting the relative balance includes adjusting one or more auto exposure settings of the rendered image and the generating the rendered image includes applying an auto exposure algorithm to an initial rendered image to produce the rendered image using the one or more auto exposure settings.

19. The system of claim 17, wherein the computation of the incident light values is executed using one or more virtual light meters instantiated at one or more of the locations within the virtual environment.

20. The system of claim 17, wherein the screen-space light buffer corresponds to an indirect diffuse light buffer.

21. The system of claim 17, wherein the determination of the subset of pixels includes:

filtering out, from a set of pixels, pixels that are determined to correspond to one or more different subjects of the virtual environment.

22. The system of claim 17, wherein the subset of pixels is determined from a rectangular grid located independently from the one or more identified subjects within a subset of the image.

23. The system of claim 17, wherein the processing circuitry is to generate the rendered image using an auto exposure algorithm to modify the relative balance in accordance with the adjustment.

24. The system of claim 17, wherein the subset of the incident light values are averaged, and the computation of the one or more exposure values is based at least on the averaged incident light values.

25. The system of claim 17, wherein the locations within the virtual environment are determined based at least on casting rays from the virtual camera into the virtual environment.

26. The system of claim 17, wherein the image corresponds to an application executing at least one of an augmented reality application, a virtual reality application, or a mixed reality application.

27. The system of claim 17, wherein the system is comprised in a cloud computing system, and the image corresponds to a cloud application executing using the cloud computing system.

\* \* \* \* \*